(12) United States Patent
Tagawa

(10) Patent No.: US 7,016,949 B1
(45) Date of Patent: Mar. 21, 2006

(54) NETWORK TRAINING SYSTEM WITH A REMOTE, SHARED CLASSROOM LABORATORY

(75) Inventor: Vick Y. Tagawa, Englewood, CO (US)

(73) Assignee: Colorado Computer Training Institute, Englewood, CO (US)

( * ) Notice: Subject to any disclaimer, the term of this patent is extended or adjusted under 35 U.S.C. 154(b) by 645 days.

(21) Appl. No.: 09/716,672

(22) Filed: Nov. 20, 2000

(51) Int. Cl.
*G06F 15/173* (2006.01)

(52) U.S. Cl. ............... 709/223; 709/203; 709/204; 709/205; 709/224; 709/227; 709/229

(58) Field of Classification Search ......... 709/200–310
See application file for complete search history.

(56) References Cited

U.S. PATENT DOCUMENTS

| | | | | |
|---|---|---|---|---|
| 5,810,747 | A * | 9/1998 | Brudny et al. ............... | 600/595 |
| 6,282,573 | B1 * | 8/2001 | Darago et al. ............... | 709/229 |
| 6,288,753 | B1 * | 9/2001 | DeNicola et al. ........... | 348/586 |
| 6,322,365 | B1 * | 11/2001 | Shechter et al. .............. | 434/21 |
| 6,371,765 | B1 * | 4/2002 | Wall et al. ................... | 434/224 |
| 6,466,971 | B1 * | 10/2002 | Humpleman et al. ....... | 709/220 |
| 6,497,655 | B1 * | 12/2002 | Linberg et al. .............. | 600/300 |
| 6,532,237 | B1 * | 3/2003 | Or et al. ....................... | 370/396 |
| 6,535,713 | B1 * | 3/2003 | Houlihan et al. ........... | 434/350 |
| 2002/0010734 | A1 * | 1/2002 | Ebersole et al. ............ | 709/201 |
| 2002/0032762 | A1 * | 3/2002 | Price et al. .................. | 709/223 |

OTHER PUBLICATIONS

Stover et al., "System and method for remotely controlling computer network testing laboratories", U.S. Appl. No. 60/183,276 filed Feb 17, 2000.*

J. Vanbokkelen, "Telnet Terminal-Type Option," Feb. 1989.
Cisco Systems, Inc. "Introduction to the Cisco Broadband Operating System," Apr. 15, 1999.
Cisco Systems, Inc. "Using the Web Interface," Apr. 9, 1999.

* cited by examiner

*Primary Examiner*—Nabil El-Hady
(74) *Attorney, Agent, or Firm*—Kent A. Lembke; Hogan & Hartson L.L.P.

(57) ABSTRACT

A system and method for providing network training to students operating communication nodes at locations remote from a classroom laboratory equipped with operational servers, routers, and other computer networking devices used to implement an IT network. The networking devices in the classroom laboratory are configured into a first operating state and placed in first operational modes. A training host generates and transmits a graphical user interface, such as a Web page, to the remote nodes, which have a display and display application (e.g., a browser). The graphical user interface displays the computer networking devices in the classroom laboratory using icons or other graphical representations of the devices illustrating how the devices are communicatively linked. Each remote node is operable to select a graphical representation of a networking device. In response, an application executes to provide a direct communication connection with the device in the classroom laboratory corresponding to the selected graphical representation and the control interface of the selected device is transmitted to the requesting remote node. The remote node communicates directly with the selected device via its control interface to monitor the device's state information and to enter commands that cause the state information to be changed, thereby remotely operating the networking devices in the classroom laboratory.

28 Claims, 3 Drawing Sheets

NETWORK TRAINING SYSTEM WITH A REMOTE, SHARED CLASSROOM LABORATORY

BACKGROUND OF THE INVENTION

1. Field of the Invention

The present invention relates to the field of networked computer systems, and particularly to a network training system and method having a dedicated, remotely-located network laboratory that students can remotely access, manage, and configure via a student interface and via a link to a communications network, such as the Internet.

2. Relevant Background

In recent years, the information technology (IT) industry has been rapidly expanding. To support this expansion, there has been a large demand within the IT industry for well-trained IT workers. Additionally, IT employers often require that candidates for their IT positions be certified (i.e., pass a certification exam) to use, install, and/or administer, as applicable, the networking and other IT equipment utilized by the IT employer. For example, an employer that uses Cisco Systems, Inc. routers and servers to network its employees, facilities, and information operations may require that all of its IT workers be certified to install and manage Cisco® networks and IT equipment. In response, a number of educational services companies now provide the specialized training courses necessary to provide IT students with the required knowledge and hands-on experience with specific IT equipment to pass certification tests developed by the IT equipment manufacturer.

These IT courses have generally been based on the traditional instructor led, on-site training model. Specifically, the course provider gives the course at a specified location or classroom where they position all of the equipment necessary to model or replicate an actual IT network and to allow an instructor and the students to configure and manage the various components of the IT network. For example, the students and instructor may each have a monitor, keyboard, and CPU (e.g., a personal computer (PC)) that are connected directly to a group of IT network components that make up a networking laboratory. For example, if the networking laboratory is modeling a remote access network, the IT network components may include a number of routers, a Web access server, an authentication, authorization, and accounting (AAA) server, a file server, a firewall or other security device, and components that model telecommuter and branch office access via a public service telephone network (e.g., PCs and modems connected via a telephone switch to a channel bank or similar device and servers connected via a network such as a frame relay cloud). During the course, students gain hands-on experience by configuring and manipulating the functional IT equipment located in the adjacent networking laboratory, typically by entering command lines through their PCs. The hands-on experience is limited to a fixed number of hours allotted for the students to use the networking laboratory.

Typically, students must master configuration of both computers (e.g., workstations, network interface cards, servers, and the like) coupled to a network and routers, hubs, and firewalls that form the network infrastructure. Each of these devices presents specific interfaces that must be learned and mastered. For example, server configuration involves knowledge of operating system commands and interfaces for Windows® NT, UNIX, and the like. As a further example, router configuration involves knowledge of the router operating system (e.g., Cisco® Internetwork Operating System or "IOS") and management interfaces. Although simulations of these devices may be technically possible, it is generally considered by those in the network training industry that simulations cannot replace the hands-on learning experience provided by a functional networking laboratory. To date, the network learning experience has required physical proximity of the student to the networking laboratory hardware.

While generally producing acceptable training results, the existing instructor led, on-site network training model has a number of ongoing problems and drawbacks. To provide hands-on experience for certification, the classroom equipment and IT equipment in the networking laboratory must be current or up-to-data, high-end equipment of the IT equipment manufacturers. Consequently, the equipment, and especially the networking laboratory equipment, can be very expensive at costs of $200,000 to $500,000 or more for a 24-person classroom. Due to this high cost, course providers usually purchase a limited quantity of the IT equipment needed for giving a course and move the equipment from one location to another to offer the same course in different locations (e.g., different cities, states, and countries). As can be appreciated, the cost for shipping the equipment including insurance and the time required for packing and unpacking are both large and are incurred for each move to a new classroom location. Moreover, import/export restrictions often make it very difficult, if not impossible, to present courses at international locations. Additionally, before a course can begin, an adequately sized and equipped classroom facility must be located and reserved, and the classroom and networking laboratory equipment must be unpacked, installed, and initially configured. Due to the complexity of the IT equipment, this initial set up can take considerable time and effort (e.g., 4 to 8 hours set up time) which further increases costs and, unfortunately, may even cut into time that was allotted for completion of the course and laboratory.

Another concern with the existing network training model is the restrictions on when and for how long students are able to access the networking laboratory. Typically, the students are given a fixed amount of time to access the networking laboratory to gain their hands-on experience. If a student works at a slower pace, the student may not be allowed to finish the offered laboratory exercises before the equipment is packed up and shipped to the next course location. Additionally, the laboratory time is typically only provided during the regular course hours, such as when the instructor is available to be in the classroom. This rigidity in the laboratory times often makes it difficult for students to attend all of the offered laboratory class times due to other commitments.

The IT industry also faces the ongoing question of whether a job applicant for an IT position will be able to perform the specific job related tasks. Presently, the IT industry has to rely on the certification and other educational processes to give an indication of whether a candidate has the proper skill sets to perform the IT tasks. Unfortunately, there is currently few ways for a prospective employer to readily prescreen or test a job applicant (certified or not certified) on specific IT skills, such as configuring and debugging an IT network similar to that used by the employer.

Consequently, there remains a need for an educational method and system for providing IT and network management training to large numbers of students in diverse geographic locations at lower cost to the student and training provider. Preferably, such a system will provide a simplified system (i.e., having less components) while still being able to provide a high level of laboratory experience to the students with increased flexibility of laboratory time scheduling for the students. Additionally, it would be preferable that the method and system be useful for prescreening IT job applicants by allowing testing of the applicants actual job-related IT skills.

SUMMARY OF THE INVENTION

The invention addresses the above and other problems of network training and certification by providing a computer system (and method for using same) for providing remote network training to students operating nodes linked to a data communications network, e.g., the Internet. The network training system includes a network training laboratory comprising computer networking devices communicatively linked so as to implement a functioning electronic communications network (e.g., a network for which the students are to be tested and certified). The devices are functioning network devices, such as servers, routers, and firewall devices, and are initially operating in a first operation mode (i.e., the configuration and operating states that the students may first be exposed to during an online course). A training host system is linked to the communications network and to the laboratory to provide, or at least enable, a direct communication connection between the networking devices in the laboratory and the individual student nodes.

The training host system is also adapted for generating and transmitting to the student nodes a student user interface comprising graphical representations (e.g., icons and the like) of each of the networking devices in the laboratory. During operation, the training host responds to the selection of a particular graphical representation by a student node by providing a direct connection between the requesting student node and the networking device corresponding to the selected graphical representation within the student user interface. The networking devices include native control interfaces that allow an operator to change the operating state of the devices. With the direct connection in place, the student node can enter instructions directly via the selected device's control interface to change its operating mode from the first operation mode to a second operation mode. In this manner, the training system enables a student operating a remotely positioned node to gain hands-on experience by directly communicating with and operating the devices of a functioning network located in the shared, network training laboratory.

In one embodiment, the training host includes a router control server connected to a router in the laboratory network and the router control server is configured to provide the direct communication connection between the student nodes and the router. A number of techniques may be used within the invention to achieve the direct communication connection, and in one embodiment, the router control server is configured as a terminal server with a terminal emulation program that enables student nodes to remotely operate the router control server. The training host may also include a server control server connected to a server in the laboratory network and configured to provide the direct communication connection between the student nodes and the server of the laboratory network. Again, a number of techniques can be used to obtain a direct communication connection, and in one embodiment, the server control server includes a remote access program that enables remote control of the server control server to achieve the direct communication connection.

According to another aspect of the invention, the present invention involves a method for using a remote node to remotely operate a functioning data communications network that includes a plurality of computer networking devices (e.g., routers, servers, firewalls, hubs, and the like). The method includes providing a host computer system linked to a communications network (such as the Internet) and having a router controller and a server controller. A communication link is made between the remote node and the communications network. The method continues with establishing a communications link between the host computer system and the functioning electronic communications network. In particular, the router controller is linked to at least one router in this network and the server controller is linked to at least one server in this functioning network. Next, the linked router is operated remotely by the remote node with communications transmitted from the remote node to the router controller. The linked server is also operated based on communications to set an operating state transmitted from the remote node to the server controller. In this manner, the remote node is able to remotely control and administer the devices within the functioning electronic communications network.

Because the present invention is not merely a simulation of the network laboratory, it provides the same "hands-on" learning experience without the expense and inefficiency of traditional mobile networking laboratories.

DETAILED DESCRIPTION OF THE PREFERRED EMBODIMENTS

The network training method and system of the present invention addresses the problem of providing IT network training to students located all over the world without shipping the IT training equipment or purchasing multiple sets of the expensive equipment. The invention provides a solution that enables the instructor and the students to use their remote nodes connected to the Internet to access, configure, and operate a single, shared network training laboratory having a set of functioning IT equipment configured and linked as a typical IT network. In this regard, the instructor and students may be located in California or South America while the remote network training laboratory remains in Colorado.

To provide the remote control functionality, the network training system of the invention includes a training host that is configured to render and deliver a graphical or command-line control interface to the instructor and student nodes which is then used to view, configure, and operate, all in real time, the functioning IT equipment in the remotely-located network training laboratory. While a key use of the network training system is within the network education environment, it is contemplated that the invention has broader applicability. For example, the invention may be used for network topology evaluation, IT job applicant screening, troubleshooting of networks, and the like.

Figure 1:
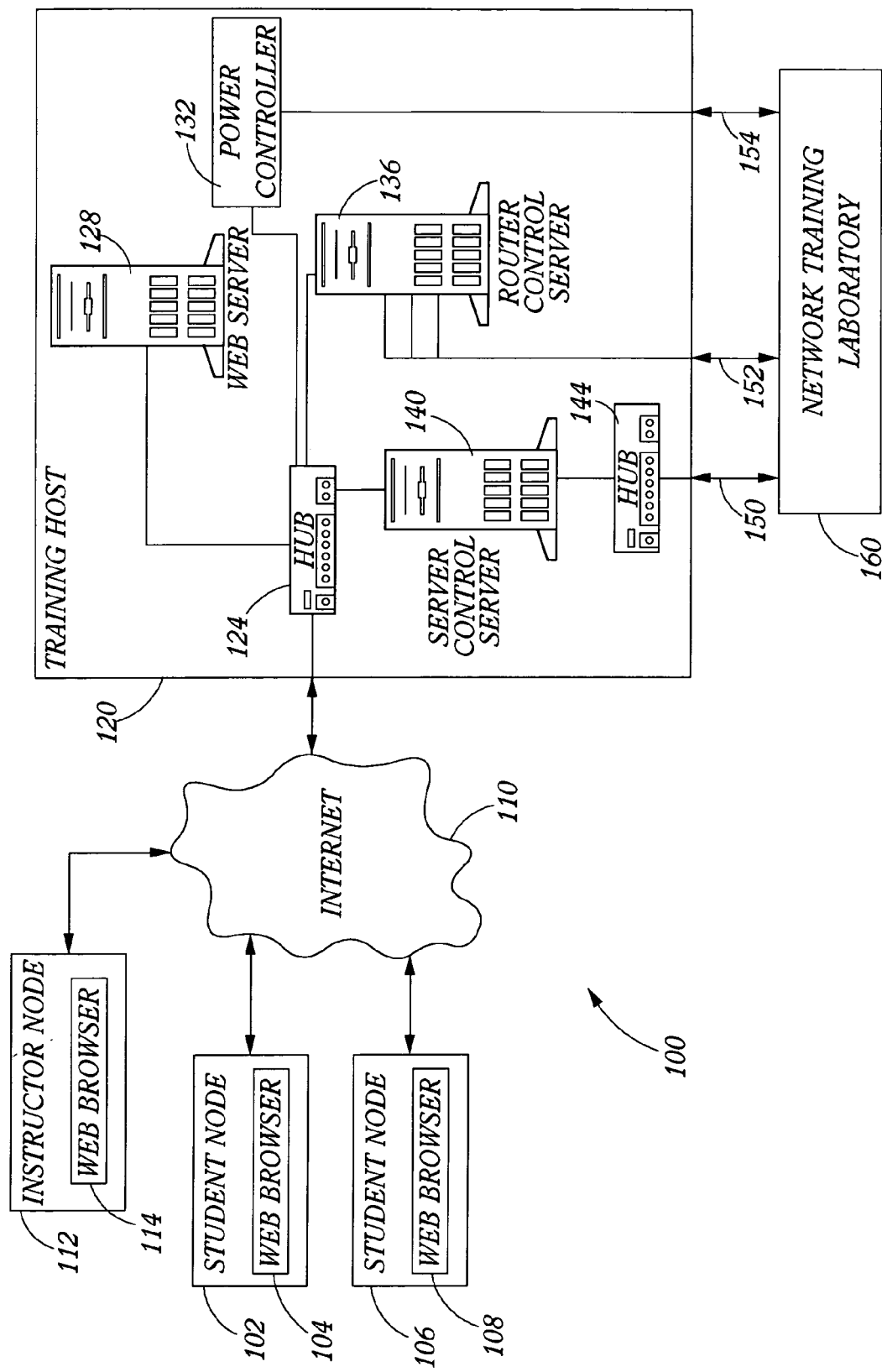
FIG. 1 is a functional schematic diagram of a network training system according to the present invention.

Referring to FIG. 1, a network training system 100 is illustrated that is useful for presenting network training, such as the type of courses useful for obtaining Cisco® Certified Network Associate (CCNA), Building Cisco® Remote Access Networks (BCRAN), and similar Cisco Systems, Inc. certifications and for obtaining other IT equipment manufacturers' certifications. According to an important aspect of the invention, the system 100 is configured for providing instructor-led network training with hands-on laboratory experience at locations that are remote from a fully-equipped, functioning set of IT network equipment placed in a central, shared laboratory 160.

Generally, the network training system 100 includes instructor node 112 and student nodes 102, 106 that are communicatively linked to training host 120 via the Internet 110 (or other communications network). Significantly, the training host 120 can access and control the network training laboratory 160 through server communication link 150, router communication link 152, and power link 154, thereby allowing the users of the instructor and student nodes 112, 102, 106 to remotely access and control the network training laboratory 160. Of course, the instructor and student nodes 112, 102, and 106, respectively, may be any electronic device useful for accessing (by wire, modem, or wireless) the Internet 110. For example, the nodes 102, 106, and 112 may be a personal, laptop, or hand-held computer with a monitor, keyboard or keypad, and mouse or other method of selecting screen images or icons. To allow a student or instructor to view and manipulate the graphical control interface of the invention, in the example implementation of FIG. 1, each of the instructor and student nodes 112, 102, 106 include a Web browser 114, 104, and 108, respectively.

Figure 2:
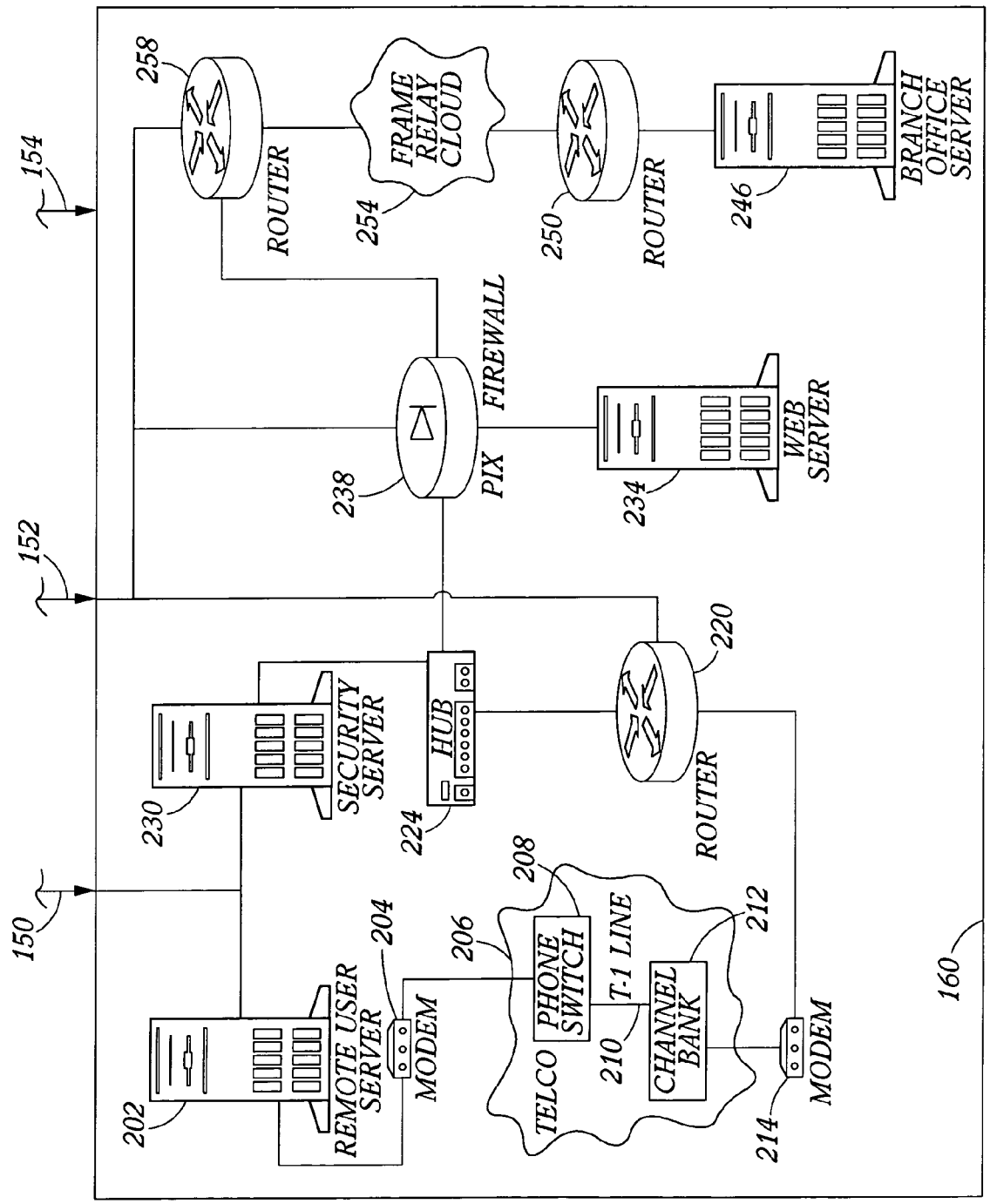
FIG. 2 illustrates an embodiment of a certification laboratory the network training system of FIG. 1.

According to one important aspect of the invention, the network training system 100 includes the network training laboratory 160 to provide students hands-on experience with functioning IT components that model typical networks used in corporations and that are tested on certification examinations. In this regard, the network training laboratory 160 can be configured in numerous ways with a wide variety of computers, routers, firewalls, servers, modems, hubs, and other IT networking equipment, and although not shown, these configurations are considered within the scope of the invention. FIG. 2 illustrates one preferred embodiment of the network training laboratory 160.

The network training laboratory 160 preferably includes a networked set of functioning IT equipment. Along with the remote control features of the invention, the laboratory enables a student to configure and otherwise manage the operation of a number of special purpose servers (such as standard Windows® NT servers) and routers (such as routers selected from a series of routers manufactured by CISCO Systems, Inc.). As illustrated, the network training laboratory 160 includes the same or similar components of a communications network in which remote users such as telecommuters and branch offices access a central site through the Internet, through a public network with frame relay services, and through a telephone company (i.e., telco) network. To illustrate communication access through a telco network such as a PSTN, the network training laboratory 160 includes remote user server 202, modem 204, telco network 206 (comprising, e.g., a phone switch 208, T-1 line 210, and channel bank 212), modem 214, and router 220 that is connected to hub 224. To allow a student to experience security issues in a network setting, a security server 230 (for example, an Authentication, Authorization, and Accounting (AAA) access server) and a firewall device 238 (e.g., a specially adapted router) are provided and linked to hub 224. To model communication access via the Internet, and control of such access, a Web server 234 is connected to firewall device 238. Another type of communication access to a central site is emulated with the inclusion of branch office server 246, router 250, frame relay cloud or network 254, and router 258 that is also linked to the network through firewall device 238. The laboratory configuration shown in FIG. 2 is an example only, and it will be understood that a wide variety of equipment and networking topologies are readily implemented in accordance with the present invention and will typically be selected and connected based on the training course or network and devices for which training is being presented.

According to another important aspect of the invention, it is preferable that users of the student nodes 102, 106 and the instructor node 112 be able to remotely access, configure, and otherwise manage the operation of selected routers, servers, and security devices in the network training laboratory 160. A number of features taken alone and/or in combination contribute to achieving this remote control functionality. For example, it is typically desirable that students be able to monitor and, often, to control some if not all of the server devices within the network training laboratory 160. In this regard, these controllable servers may include the remote user server 202 and the security server 230. To enable remote control, these servers 202 and 230 are linked to the training host 120 directly through server communication link 150. To allow remote control of these servers 202, 230 by the training host 120, the servers 202, 230 may be configured as terminal servers ready to transmit existing operating state and/or configuration data and accept transmitted commands (although other server configurations may be utilized).

Further, it is typically desirable for network training students to monitor, configure, and operate most if not all routers and firewalls in a network. In this regard, management ports of routers 220 and 258 and firewall 238 are linked to the training host 120 by router communication link 152 over which existing operation/configuration state data and commands may be transmitted.

Additionally, power is provided to each of the devices of the network laboratory 160 through power link 154. In a preferred embodiment, power is provided selectively to the devices of the laboratory 160 by the training host 120 to improve the remote control feature of the invention. For example, it may be useful to allow an instructor to shut off a specific device for which a student has inadvertently changed the password.

According to an important feature of the invention, the remote nodes 102, 106, and 112 are provided a direct communication connection to devices within the network training laboratory 160. In other words, a student node, such as node 102, is communicatively linked to the functioning network in the laboratory 160 and can remotely provide control instructions to the devices. Referring again to FIG. 1, the training host 120 is generally included to communicate with the network training laboratory 160 and instructor and student nodes 112, 102, 106 to pass communications to select devices in the laboratory 160 to allow remote monitoring and operation of such devices. A hub 124 is included to share access over the Internet 110 with the nodes 102, 106, and 112 and to direct received signals to the proper components of the training host 120. Hub 124 is connected to Internet 110 via appropriate customer premises equipment (CPE) terminating the Internet 110 connection, such as a router, ISDN terminal, modem, or the like (not shown) supporting IP protocols.

Figure 3:
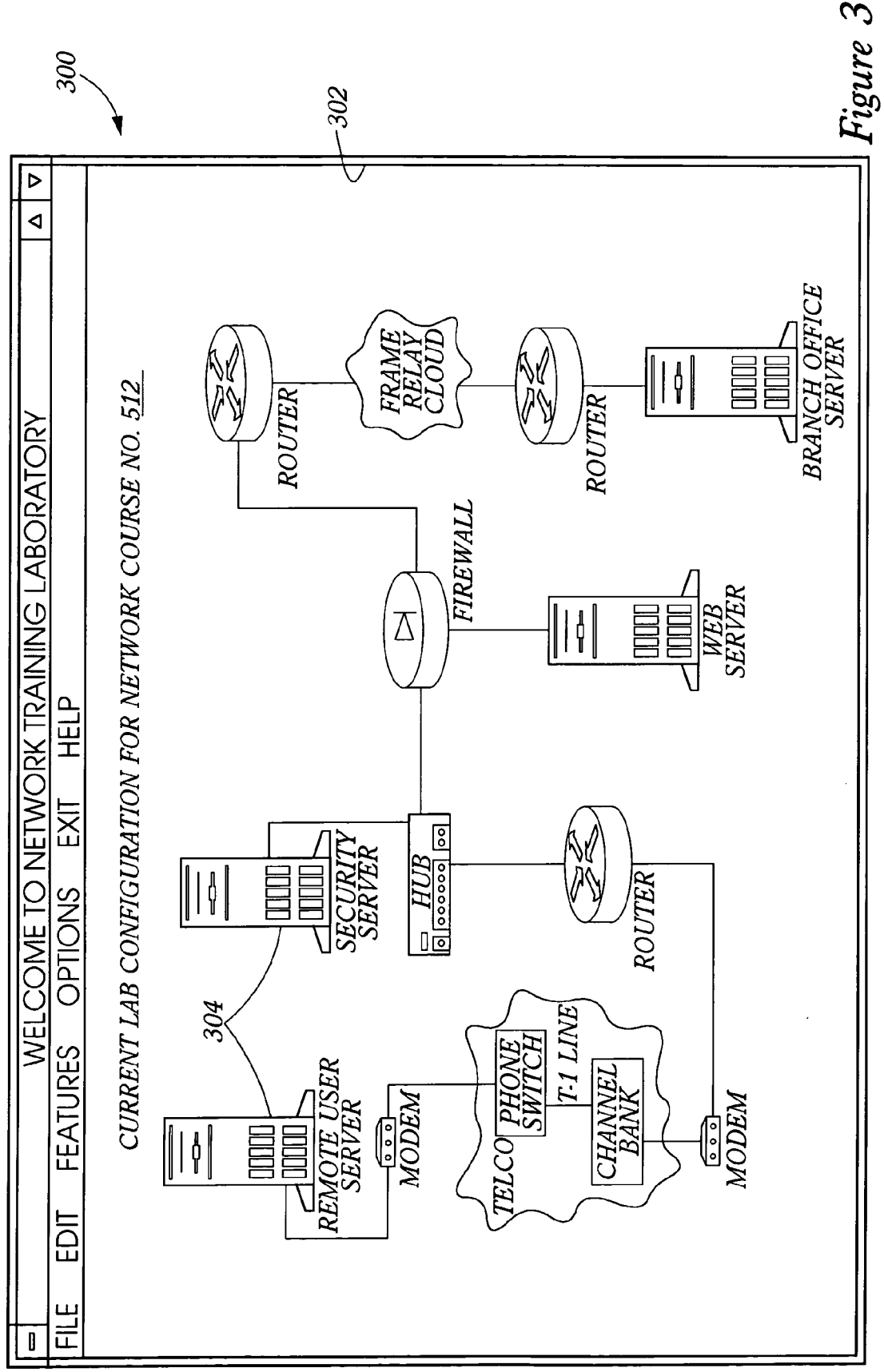
FIG. 3 is an exemplary screen of the graphical student interface of FIG. 1 displaying the certification laboratory of FIG. 2.

According to the invention, a number of techniques can be used as part of the invention to present node 102, 106, 112 with information on the configuration of the router, server, and other IT equipment in the laboratory 160 over the Internet 110 (e.g., to inform the students and instructors which IT equipment is functioning in the laboratory 160 and how it is connected) and to provide direct connections with the functioning components of the laboratory 160. As an example, but not as a limitation, a typical remote training session (e.g., a terminal session) may begin with a student at a student node 102, 106 remotely contacting the training host 120 over the Internet 110 (i.e., logging into a network training Web site (not shown)). In a preferred embodiment, the training host 120 communicates with the nodes 102, 106, and 112 by developing a user-friendly, graphical control interface 300 as shown in FIG. 3. In this manner, the users of the nodes 102, 106, and 112 are quickly and visually presented with the configuration of the functioning network in the laboratory 160.

Web server 128 is included in the training host 120 to create and update (on an ongoing, real-time basis) the graphical control interface 300 (as well as the initial training Web site). The Web server 128 also provides an administrative interface or function in the system 100 by enabling scheduling of the use of the laboratory 160 and allowing an operator of the training host 120 to assign students, customers, and instructors. In general, the interface 300 functions to provide a user-friendly front end through which direct access to the devices in the laboratory 160 can be achieved, such as by clicking on a device icon (as will be explained in more detail). In one embodiment, the Web server 128 creates the graphical control interface 300 to include Web pages (i.e., an HTML document) that can readily be transmitted over the Internet 110 and be accessed at student and instructor nodes 102, 106, and 112, respectively, with Web browsers 104, 108, and 114. Web pages may include static or dynamic content and may be pulled from or pushed to browsers as appropriate for a particular application. Of course, the devices of the network in the laboratory 160 may be displayed in numerous fashions other then with icons, such as tree structures, pull down menus, and the like, and these other embodiments are considered within the breadth of this disclosure.

Referring to FIG. 3, an important aspect of the invention is that initially the graphical user interface 300 displayed at each node 102, 106, 112 includes a transmittal form such as Web page 302 that provides a quickly understandable map containing each of the components of the network training laboratory 160. State and other relevant information (e.g., IP addresses, proxy servers, MAC, and the similar information), especially for routers and servers, may be provided on the Web page 302 to allow students to understand the interrelationship between each of the components in the network training laboratory 160. Additionally, the graphical user interface 300 is more user-friendly because it hides the complexities of any Internet Protocol (IP) addressing involved in the remote use of the laboratory 160 and overcome by the invention, rather than requiring the user to type in multiple IP addresses for each device. Specifically, ease of use is enhanced by allowing users to merely select (by operating a mouse or other input device associated with their node 102, 106, 112) an icon 304 or image map using GUI control on Web page 302 associated with a particular component to be linked to a control screen or management page (e.g., a window communicating the selected devices interface, such as a text dialog box for a router, overlying a portion or all of the Web page 302). In FIG. 3, a Web page 302 is illustrated having a mapping of IT equipment for the embodiment of the network training laboratory 160 shown in FIG. 2 with the components of the network training laboratory 160 shown as icons 304.

When a GUI control corresponding to a component in the laboratory 160 is selected (i.e., the user "clicks" on an image or icon), a separate application is launched at the training host 120 (or alternatively, an application running on each node 102, 106, 112) that connects the node 102, 106, or 112 directly to the selected component. The connection may be achieved in a variety of ways, such as via a terminal application and associated protocol, such as Telnet, or via remote control applications. As a result of this direct connection, the nodes 102, 106, 112 communicate directly with the devices and view the device's interface, which generally vary depending on the device and the device manufacturer.

In one embodiment, the selected device's control interface is displayed as part of (or overlying) the graphical control interface 300 on the node 102, 106, 112 with the interface 300 providing a user-friendly, managed interface to the devices in the laboratory 160. Significantly, this enables display of the state information pertaining to the component corresponding to the selected icon 304 because the nodes 102, 106, and 112 are now connected directly to the components. For example, in the case of a router, configuration without use of the invention would have to be achieved by connecting a PC directly to the management port of the particular router. The router's manufacturer typically provides for a command line and/or a Web browser-type interface for viewing state information for the connected router and for configuring and changing the settings of the router through use of the manufacturer's particular operating system. In contrast, according to the invention, the router's interface is provided remotely on the display of the nodes 102, 106, 112 where it can then be directly manipulated by the user. In this manner, the user of the nodes 102, 106 is able to gain hands on experience from a remote location. In other words, users are able to remotely configure and administer the components as if they were operating a PC at the physical location of the laboratory 160 and are able to see the results of the network changes in real time (e.g., nearly instantaneous feedback on their selected component settings).

To allow this type of remote control functionality, the training host 120 includes a router control server 136 to enable control of router devices and a server control server 140 to enable control of server devices. In general, these servers 136, 140 are configured to allow the nodes 102, 106, and 112 to remotely operate the servers 136, 140 and to remotely operate servers and routers in the network training laboratory 160 that are directly connected to the servers 136, 140. Web server 128 and the servers 136, 140 are communicatively linked to allow state information and commands to be transmitted between the student and instructor nodes 102, 106, 112 and the individual components of the network training laboratory 160.

In this regard, the router control server 136 is illustrated having three ports that are connected with router communication link 152 to routers 220, 238, and 258. Typically, this connection will be from a serial port on the server 136 to the management ports of the routers 220, 238, and 258. To enable remote configuration, the router control server 136 is configured as a terminal server (such as, for example, a router connected at the console port and having a reverse Telnet configuration). In one embodiment, remote control of the router control server 136 is achieved by using a terminal emulation program that allows the user nodes 102, 106, and 112 to operate as if they were hard wired to the routers 220, 238, and 258 (i.e., as if their node was the server 136). While a number of terminal emulation programs may be used, one preferred embodiment uses Telnet-supporting application software such as Microsoft® Hyperterminal with TCP/IP support.

To facilitate remote control of the servers of the network training laboratory 160, the server control server 140 is connected to hub 144 that communicates with servers 202 and 230 via the server communication link 150. In one embodiment, the server control server 140 is a Windows® NT remote access server with remote access software, such as Citrix® or PCAnywhere®, to allow the nodes 102, 106, and 112 to directly connect with and operate the servers 202, 230. During a standard training session, a student node 102, 106 first takes control of a session of the remote access software on the server control server 140 which then takes remote control of connected remote user server 202 and security server 230 that preferably are configured as terminal servers. According to an important feature of the invention, the Web server 128 operates to create and update the graphical control interface 300 with Web page 302 such that obtaining remote control of the servers 136 and 140 is accomplished automatically and is transparent to a user of the nodes 102, 106, 112. This is important because ideally the physical remoteness of the laboratory 160 is hidden and has little or preferably no impact on a student using a student node 102, 106.

To further this transparency feature, the Web server 128 functions to track and properly match private IP addresses used within the network of the laboratory 160 with the use of public IP addresses for the devices and/or ports of the training host 120. Clearly, it is important that the private IP addresses be properly associated with the ports and devices in the training host 120 that are used to remotely control and to transfer data to and from the private network devices. In this regard, the Web server 128 creates tables or maps that contain IP addresses of all of the components in the network training laboratory 160. The laboratory 160 is maintained as a private or inside network and these IP addresses are not transmitted over the Internet 110. The Web server 128 matches or maps these private IP addresses with the appropriate ports on the server and router control servers 136 and 140, which typically have public IP addresses. As a further method of ensuring proper remote control, the Web server 128 operates to associate or map an IP address with each icon or image map 304 shown in Web page 302 of the graphical control interface 300. In this manner, the Web server 128 is able to provide the appropriate communication connection (and, therefore, the appropriate control interface) for the component associated with the icon 304.

To further achieve remote control over the laboratory 160, the training host 120 includes a power controller 132. As discussed above, in some situations, it is desirable to be able to turn off the power to select components in the laboratory 160, such as when it is desired to recover from the improper changing of a password on a device. In this regard, the power controller 132 preferably is a device capable of receiving and responding to commands (such as Telnet commands) from the nodes 102, 106, 112 (although the instructor node 112 may be the only node that has rights to operate the power controller 132). Preferably, the power controller 132 includes a separate power jack or receptacle for each of the devices in the laboratory 160 and is configured to be able to provide or remove power to specific jacks upon receiving a command from a node 102, 106, 112. Of course, each of the jacks is mapped or otherwise linked to specific devices in the laboratory 160 to facilitate such remote power control.

The network training system 100 is typically operated in connection with lectures as a laboratory portion of a network training course. In this environment, it is an effective tool that allows students to remotely access and operate a functioning network and allows an instructor to quickly establish a desired state in each of the components of the network in the network training laboratory 160. For example, an instructor leading a course may lecture on how to initially configure a network (i.e., as if the IT equipment was just being put into service) with the laboratory work being to configure the devices in the network training laboratory 160. In this example, the instructor can transmit a reset or initiation command script (such as by playback of a Visual Basic or other programming language script acceptable by the Web server 128) from the instructor node 112 to the Web server 128 to place the equipment in the laboratory 160 network in proper initial states. The Web server 128 responds by operating the router control server 136 and server control server 140 to reconfigure these devices to an initial state. As can be appreciated, by transmitting a command script an instructor can establish (or reset to) a great variety of beginning states for the network training laboratory 160, thereby significantly increasing the speed and ease of providing a network training course.

The use of a transmitted command script to reset the network training laboratory 160 has a number of other important uses. For example, in one embodiment, the graphical control interface 300 includes one or more buttons that are useful for allowing a student to instruct the training host 120 and particularly the Web server 128 to place the network training laboratory 160 in a specific state. Specifically, a save button can be included to enable a student to save the current network training laboratory 160 system state for later use (e.g., the button may correspond to a command script that instructs the routers to show their state which can then be captured by the Web server 128 as a text file). This allows a student to work with the network training laboratory 160 on an intermittent schedule without having to waste time starting over. When the student logs back on to the training host 120, the student can select a restore option or button which will instruct the Web server 128 to place the network training laboratory 160 into the previously saved state. A clear option or button may also be included to allow a student to quickly reset the network training laboratory 160 to the initial state of the current laboratory session. The instructor may also be able to quickly check students' results by comparing states saved by students with preferred solutions to the given laboratory problems (which themselves may be saved states of the network training laboratory 160 previously saved by the instructor or others).

The unique features of the network training system 100 make it desirable for use outside the education environment. For example, the network training system 100 provides excellent tools for prescreening IT or networking job applicants. In this environment, a method of operating the system 100 includes the identification of employment criteria for an IT position within a company (e.g., the employee may need to be able to initially configure a new network, debug problems in an existing network, and/or be able to add or change network security). Next, the network training laboratory 160 is configured or placed in a test state (e.g., in an "out-of-the-box" state or as an existing network with errors). The applicant is then screened remotely by being given access to a student node 102, 106 with the graphical control interface 300 showing the components of the laboratory 160 network on a Web page 302. As discussed above, the applicant can then use the graphical control interface 300 to remotely change the configurations of the components of the network training laboratory 160, thereby indicating their true or current IT skills as they relate to the particular IT position the company wishes to fill.

According to another embodiment of the invention, important administrative functions and controls are provided with the inclusion of an administrator tool or mechanism (not shown) in the training host 120 (or as a separate entity) of the network training system 100. As discussed above, the network training system 100 facilitates remote control by an instructor node 112 to set up the laboratory 160 in a particular classroom or other configuration and by the student nodes 102, 106 to directly communicate and remotely control and configure the components of the laboratory 160 to obtain hands-on learning.

Additionally, in one preferred embodiment, the network training system 100 provides additional maintenance, scheduling, security, and other functions that are provided with the administrator tool, e.g., software programs and applications executing on the web server 128 of the training host 120 or on separate/additional computer devices). Significantly, these additional functions are again provided remotely to additional nodes (not shown) such as training partner nodes and administrator nodes, the instructor node 112, and student nodes 102, 106 (e.g., added security). The administratively-enhanced embodiment of the network training system 100 provides for multiple node accessing of the training host 120 to schedule, maintain, and use the network training laboratory 160 efficiently over the Internet 110 or other communication network. For example, the administrator mechanism enables a training partner or administrator to schedule use and/or initial configuration of the network training laboratory and to arrange payment for such scheduled use remotely. These and other features provided by the administrator mechanism are discussed in more detail below, along with interfaces provided by the administrator mechanism to achieve these additional features.

In this embodiment of the system 100, the administrator mechanism can be thought of as providing four unique interfaces (e.g., how a user of a remote node communicates with a computer device) into the training host 120 and, therefore, the network training laboratory 160. These interfaces include an administrative interface for users having maintenance level access, a training partner interface for users of the system 100 that provide classes or other training with the laboratory 160 (or rent its temporary use), and the instructor and student users discussed above with reference to nodes 102, 106, 112. The administrator mechanism may function to first display a general interface that allows the user to select the type of access they desire, and once a selection is made link that user to an appropriate interface (where security is implemented). Alternatively, a general interface can be provided that requests login and security information, and the administrator mechanism processes inputted information to determine the type of interface to provide to the user based on their login and security information.

In a preferred embodiment, the administrator mechanism is configured to communicate with an administrator node over the Internet 110 to provide an administrative interface (such as a Web page viewed on a monitor at the node with a browser application with dialog boxes, hypertext links, and the like). During use, security is provided with the administrative interface by first requesting that a unique identification code (e.g., text, numerical information, and the like) and/or a password. The user or administrator enters this information and the administrator mechanism verifies the information received prior to granting access. Once access is granted, the administrative interface is preferably adapted to provide the user with maintenance capabilities for the network training system, such as administering the number and identify of training partners, maintaining student (and other user) accounts including password maintenance, remotely creating and modifying configuration of the network training laboratory 160, generating laboratory reservation and use reports, and implementing and enforcing limitations on reservation and use of the laboratory 160 (such as placing limitations on the numbers and quantity of use by training partners, giving priority to certain training partners, and other usage control features). Through interaction with the administrative interface, a user is able to remotely administer the network training laboratory 160 by controlling its use as well as its configuration.

The administrator mechanism further operates within the system 100 to provide a training partner interface. Again, a login page or screen may first be generated by the administrator mechanism to allow the user of a training partner node (e.g., a computer device with a display and a browser application) to input a user identification code and/or password (which are preferably assigned by the administrative node via the training host 120). The administrative mechanism receives the inputted user identification code and/or password and verifies the information (such as by comparison with information in a database or other memory device, not shown). The database preferably also includes profile information pertaining to the training partner, such as use limitations, billing information, and the like, for use by the administrator mechanism in generating the training partner interface and associated functionality. If properly verified, the administrator mechanism acts to generate a training partner interface, with or without personalization, and deliver it to the user's node to provide a communication interface.

During operation of the system 100, the training partner interface provides the user or training partner with direct access to a resource scheduling application or facility. In one embodiment, the resource scheduling application functions to enable a training partner to view available times for using the laboratory 160 for training and other purposes and allow scheduling of instructors. In this regard, the resource scheduling application may function to display through the training partner interface when the network training laboratory 160 is available and under what configurations (and in systems 100 having more than one laboratory 160, when each such laboratory is available and under what configurations). In one embodiment, the laboratory availability is displayed by the resource scheduling application in calendar format, and when the user selects a day, week, or other selectable time period, a reservation screen is invoked by the resource scheduling application. In a preferred embodiment, the reservation screen is personalized to display the laboratories 160, configurations, and time periods that the requesting user had previously reserved. Upon reservation completion or at any intermediate time, a reservation report can be requested by the user and generated by the scheduling application.

During the reservation process, such as after requesting a time period and configuration of a specific lab, billing information preferably is provided to the requesting user to assist in making a reservation decision. Additionally, a payment method may be requested and verified. For example, the personalization of the training partner interface may include retrieving existing credit card or payment method information from memory and requesting the user to verify that displayed payment method information is correct for the requested reservation of the laboratory 160. When confirmed, the reservation scheduling application will confirm the reservation and denote in a reservation database or other data file that laboratory 160 has been reserved (and at what time and initial configuration). Other training partners will be provided availability information that shows the laboratory 160 unavailable at the now reserved time. Further limitations may be applied by the resource scheduling application, such as limiting the number of laboratories 160 that each training partner can reserve (which is configurable by an administrative user via an administrative interface). As an additional part of the training partner interface, the user in certain embodiments of the system 100 is able to view various laboratories 160 to view available networking components and configurations (e.g., equipment specifications and the like) and to take virtual, online tours of the system 100 and available laboratories 160 and of classroom and other applications and operations of the laboratory 160.

The administrator mechanism provides a student interface for use with student nodes 102, 106, as discussed in detail above. Security may be provided by the administrator mechanism by again requiring entry at an initial general interface or Web page of a student login identification code and/or password. The login identifications and passwords may be assigned at any time, and in one embodiment are assigned by the administrator mechanism at the time a laboratory 160 is reserved by a training partner (e.g., the student login identification codes and/or passwords are provided to the training partners who distribute them to their students). In this embodiment, the connections corresponding to the particular codes and/or passwords are only for the laboratories 160 and times reserved by the training partner. The student interface provides a link to a graphical illustration of the laboratory 160 configured for their particular class. The display may further only show or otherwise indicate the particular components involved in an assignment of the online course. This assignment graphic or user interface is configured or activated such that clicking or otherwise selecting an image corresponding to a laboratory component causes the system 100 to initiate a configuration session for that particular component. For example, the configuration session may be via an EIA/TIA 232 ASCII serial connection (e.g., standard router console), via a NT4.0 or Windows® 2000 console GUI, or other connection as appropriate to the networking equipment included in and actually functioning in the laboratory 160.

Similarly, the instructor node 112 is provided an instructor interface as discussed above by the administrator mechanism of the system 100 obtain direct access to the equipment in the laboratory 160. Again, security is provided by the training partner or administrator distributing a login identification code and/or password that the user of the instructor node 112 uses to access the training host 120 and which is verified by the administrator mechanism. The instructor interface provides higher access rights than the student interface with the user of the node 112 being able to directly access all of the equipment in the laboratory 160, such as to allow configuration of the equipment for assignments and/or class lectures (e.g., real time demonstrations when the student nodes 102, 106 are concurrently logged on to the training host 120). These instructor connections to the laboratory 160 are only available during the reserved times associated with the login code and password. The instructor interface further differs from the student interface by displaying a listing of the pre-assigned student identifications and passwords and other student information that may be useful in conducting an online course. The instructor interface may also have access to supplemental information on the training host 120, such as laboratory configuration files that may be utilized to configure all of the equipment in the laboratory 160 for a particular class or point in a class (e.g., configure for a particular lesson or lecture).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the remote control features of the invention lend themselves readily to the remote administration or management of networks, and this method of operating the invention is considered within the scope of the disclosure (i.e., the network training laboratory 160 may readily be replaced with a similar type of network that is used for non-educational purposes).

Additionally, the features of the invention make the invention useful for operation of a network testing environment in which a IT network and its configuration can be fully tested and any problems corrected (both remotely by company IT personnel or third parties) prior to changing an existing network's configurations and/or prior to making capital expenditures on purchasing and installing an IT network. Further, it is understood that the features of the invention allow great flexibility in scheduling laboratory training as the network training laboratory 160 can be used remotely (i.e., anywhere where Internet access is available), 24 hours a day. The laboratory 160 can be used for differing network courses at different hours of the day simply by having the student or instructor initializing or restoring the state of the equipment in the laboratory 160 to a desired state.

I claim:

1. A computer system for providing network training to students operating nodes linked to a data communications network, comprising:

a network training laboratory comprising computer networking devices communicatively linked to implement a functioning electronic communications network and operating in a first operation mode; and a training host communicatively linked to the communications network and to the network training laboratory for providing a communication connection between the computer networking devices and the student nodes and for generating and transmitting to the student nodes a student user interface comprising graphical representations of the computer networking devices in the network training laboratory, wherein the computer networking devices and the first operation mode are set by the training host prior to communication with the student nodes;

wherein the training host is further adapted to provide a particular communication connection to a particular one of the computer networking devices in response to a student node selecting the graphical representation corresponding to the particular computer networking device, and to affect a change of the operating mode of the particular one of the computer network devices to a second operating mode.

2. The computer system of claim 1, wherein the computer networking devices include native interfaces and the communication connection provided by the training host is adapted for providing the native interface of the particular networking device to the selecting student node and for transmitting instructions to change the particular computer networking device from the first operation mode to the second operation mode.

3. The computer system of claim 1, wherein the training host includes a Web server and the student user interface is a graphical user interface comprising a Web page.

4. The computer system of claim 1, wherein at least one of the student nodes is located at a location physically remote from the network training laboratory.

5. The computer system of claim 1, wherein the computer networking devices include a router, and wherein the training host includes a router control server connected to the router and configured for providing the communication connection from the student nodes to the router.

6. The computer system of claim 5, wherein the router control server is configured as a terminal server with a terminal emulation program that enables the student nodes to remotely operate the router control server to provide the communication connection between the router and the student nodes.

7. The computer system of claim 1, wherein the computer networking devices include a server, and wherein the training host includes a server control server connected to the server in the network training laboratory and configured for providing the communication connection from the student nodes to the server.

8. The computer system of claim 7, wherein the server control server includes a remote access program that enables remote control of the server control server to achieve the communication connection between the server and the student nodes.

9. The computer system of claim 1, further including an instructor node communicatively linked to the communications network and adapted for transmitting a network state instruction set to the training host, wherein the training host is configured to respond to receipt of the instruction set by placing the computer networking devices in a second operation mode.

10. A method for providing network training to students at locations remote from a network training laboratory comprising computer networking devices for implementing a functioning electronic communications network, the method comprising:

positioning the network training laboratory at a laboratory site; establishing a communications link between the network training laboratory and a training host;

placing the computer networking devices in the network training laboratory into a first operating state by the training host;

with the training host after completion of the placing of the computer networking devices in the first operating state, generating a transmittal form comprising identifying information for each of computer networking devices in the network training laboratory;

establishing a communications link over a communications network between the training host and a remote node located at a site differing from the laboratory site; and operating the training host to transfer the transmittal form over the communications network to the remote node;

operating the remote node to view the transmittal form and to select one of the computer networking devices; and responding with the training host to the selection by establishing a communication connection between the remote node and the selected one of the computer networking devices, and affecting a change of the operating state of the selected one of the computer network devices to a second operating state.

11. The method of claim 10, wherein the transmittal form includes a relational map of the computer networking devices with icons corresponding to each of the computer networking devices.

12. The method of claim 10, further including receiving at the remote node a native interface transmitted over the communications connection for the selected one of the computer networking devices, operating the remote node to enter a state change instruction through the native interface, and operating the selected one of the computer networking devices in response to the state change instruction to move to the second operating state.

13. The method of claim 12, further including saving information for the first operating state and the second operating state and with the training host, using the saved state information to place the computer networking devices in the network training laboratory into the first operating state or the second operating state.

14. The method of claim 12, further including establishing employment criteria defining network management qualifications, wherein the first operating state is selected based on the employment criteria to place the network training laboratory in a test state, and further including providing a job applicant with access to the remote node and comparing the second operating state to predefined acceptable operating states selected based on the employment criteria.

15. A method of using a remote node to remotely operate a functioning electronic communications network having a plurality of computer networking devices including routers and servers, comprising:

providing a host computer system linked to a communications network, the host computer system including a router controller and a server controller;

communicatively linking the remote node to the communications network;

establishing a communication link between the host computer system and the electronic communications network, wherein the router controller is linked to at least one of the routers and the server controller is linked to at least one of the servers;

operating the remote node to select an operating state for the linked routers, wherein the linked routers are configured to the selected operating state based on communications from the remote node transmitted over the communications network to the router controller; and operating the remote node to select an operating state for the linked servers, wherein the linked servers are configured to the selected operating state based on communications from the remote node transmitted over the communications network to the server controller.

16. The method of claim 15, wherein the router controller is a terminal server including a terminal emulation program and the server controller is a server including a remote access program.

17. The method of claim 15, wherein host computer system includes a server, and further including operating the server to create and transmit a user interface over the communications network to the remote node including graphical representations of the computer networking devices, and wherein the operating steps of the remote node include selecting one of the graphical representations and operating the host computer system to create a communication connection between the remote node and a computer networking device corresponding to the selected graphical representation.

18. The method of claim 15, wherein the host computer system further includes a power controller linked to the computer networking devices and adapted for selectively providing power to each of the computer networking devices, and further including operating the power controller remotely from the remote node to control the selective provision of power.

19. A method of providing online training using a centralized, fully operational computer laboratory, comprising:
providing a network training laboratory comprising operating computer network devices linked and configured as a functioning network;
inserting a training host including an administrator mechanism between the network training laboratory and a data communications network, wherein the training host is communicatively linked to the data communications network and the network training laboratory to provide a direct communications path to the network devices of the laboratory;
connecting an instructor node to the data communications network;
connecting a student node to the data communications network;
first operating the administrator mechanism to deliver an instructor interface to the instructor node, wherein the instructor interface is configured to provide access over the direct communications path to each of the network devices of the laboratory; and
second operating the administrator mechanism to deliver a student interface to the student node, wherein the student node is configured to provide access over the direct communications path to a course subset of the network devices of the laboratory.

20. The method of claim 19, further including connecting an administrative node to the data communications network and third operating the administrator mechanism to deliver an administrative interface to the administrative node that is configured to provide access over the direct communications path to each of the network devices of the laboratory.

21. The method of claim 20, wherein the administrative interface is further configured to enable a user of the administrative node to monitor and control the first and second operating of the administrator mechanism to selectively provide the student and instructor interfaces.

22. The method of claim 20, further including connecting a training partner node to the data communications network and fourth operating the administrator mechanism to deliver a training partner interface to the training partner node, wherein the training partner interface is configured to provide access to a resource scheduling application of the training host that is adapted for monitoring availability of the laboratory and for controlling access to the laboratory to reserved times.

23. The method of claim 22, wherein the resource scheduling application operates to display the availability of the laboratory through the training partner interface, to receive reservation requests from the instructor node, and to update the reserved times based on the received reservation requests.

24. The method of claim 23, wherein resource scheduling application is further adapted for display profile information pertaining to the training partner including previous payment information and to request and receive through the training partner interface input payment information, and further, wherein the resource scheduling application verifies the input payment information prior to updating the reserved times.

25. A method of administering configuration of and access to a network training laboratory including operable network devices linked and configured as a functioning computer network, the method comprising:
communicatively linking a training host to the network training laboratory and to a communications network, wherein the training host includes an administrator mechanism adapted for generating a plurality of user interfaces providing a plurality of differing levels of administrative and communication access to the training host and to the network devices of the laboratory;
first providing with the administrator mechanism an administrative one of the user interfaces to an administrative node in communication with the communications network, the administrative user interface being configured to grant a user of the administrative node full access to the training host and each of the network devices;
second providing with the administrator mechanism an instructor one of the user interfaces to an instructor node in communication with the communications network, the instructor user interface being configured to grant a user of the instructor node access to each of the network devices; and
third providing with the administrator mechanism a student one of the user interfaces to a student node in communication with the communications network, the student user interface being configured to grant a user of the student node access to a course subset of the network devices.

26. The method of claim 25, further including fourth providing with the administrator mechanism a training partner one of the user interfaces to a training partner node in communication with the communications network, the training partner interface being configured to grant a user of the training partner node communication access to a resource reservation application of the training host.

27. The method of claim 26, wherein the resource reservation application operates to display available time periods for the laboratory via the training partner interface at the training partner node, to receive selection input requesting one of the time periods from the training partner node via the training partner interface, and to remove the requested time period from the available time periods.

28. The method of claim 25, wherein prior to the first, second, and third providing, the administrator mechanism requests, receives, and verifies login information from the users of the administrator node, the instructor node, and the student node.

\* \* \* \* \*